(12) United States Patent
James

(10) Patent No.: US 7,055,848 B1
(45) Date of Patent: Jun. 6, 2006

(54) FOLDING TRAILER

(75) Inventor: Paul A. James, Rainelle, WV (US)

(73) Assignee: Woodland Wonder Cart, LLC, Rainelle, WV (US)

( * ) Notice: Subject to any disclaimer, the term of this patent is extended or adjusted under 35 U.S.C. 154(b) by 0 days.

(21) Appl. No.: 10/896,127

(22) Filed: Jul. 21, 2004

Related U.S. Application Data

(63) Continuation-in-part of application No. 10/140,652, filed on May 7, 2002, now abandoned.

(60) Provisional application No. 60/289,104, filed on May 7, 2001.

(51) Int. Cl.
*B62D 53/06* (2006.01)

(52) U.S. Cl. ........................ 280/656; 280/401

(58) Field of Classification Search ................ 280/656, 280/638, 789, 42, 401, 491.1, 639, 645; 414/462
See application file for complete search history.

(56) References Cited

U.S. PATENT DOCUMENTS

| | | | | |
|---|---|---|---|---|
| 2,569,965 A * | 10/1951 | Wiedman | ................. | 296/182.1 |
| 3,989,264 A * | 11/1976 | Lovendahl | ................. | 280/401 |
| 4,175,768 A * | 11/1979 | Thackray | ................. | 280/652 |
| 4,362,316 A * | 12/1982 | Wright | ................. | 280/656 |
| 4,786,073 A * | 11/1988 | Harper | ................. | 280/656 |
| 5,354,090 A * | 10/1994 | Grovom | ................. | 280/656 |
| 5,570,898 A * | 11/1996 | Albert | ................. | 280/656 |
| 5,607,176 A * | 3/1997 | Leib et al. | ................. | 280/656 |
| 5,658,003 A * | 8/1997 | Jensen | ................. | 280/474 |
| 5,924,836 A * | 7/1999 | Kelly | ................. | 414/482 |
| 6,254,117 B1 * | 7/2001 | Cross | ................. | 280/401 |
| 6,378,893 B1 * | 4/2002 | Jager | ................. | 280/656 |
| 6,511,092 B1 * | 1/2003 | Chepa | ................. | 280/656 |
| 6,692,014 B1 * | 2/2004 | Grosso et al. | ................. | 280/491.1 |
| 6,767,025 B1 * | 7/2004 | Hagen | ................. | 280/401 |
| 6,846,003 B1 * | 1/2005 | Thompson | ................. | 280/656 |
| 2003/0102655 A1 * | 6/2003 | Thompson | ................. | 280/656 |
| 2003/0222431 A1 * | 12/2003 | Crosby et al. | ................. | 280/656 |
| 2004/0032114 A1 * | 2/2004 | Hagen | ................. | 280/656 |

* cited by examiner

*Primary Examiner*—J. Allen Shriver
(74) *Attorney, Agent, or Firm*—Everman Law Firm, PA; Gregory R. Everman

(57) ABSTRACT

A foldable trailer that is attachable to a vehicle, particularly an ATV, for hauling a load. The trailer includes a hitch assembly for attachment to the vehicle, a first bed rotatably attached to the hitch assembly, and a second bed rotatably attached to the first bed by a unique hinge. The trailer may be tightly folded to, and carried by, the ATV so that the trailer can be brought through otherwise inaccessible terrain. Moreover, when in the folded position, a rear rail of the trailer may be opened to carry articles. When the trailer is deployed, the first bed is coplanar with the second bed to provide an enlarged area for holding articles. The hinge, joining the first bed to the second bed, allows the trailer to support a significant load.

16 Claims, 7 Drawing Sheets

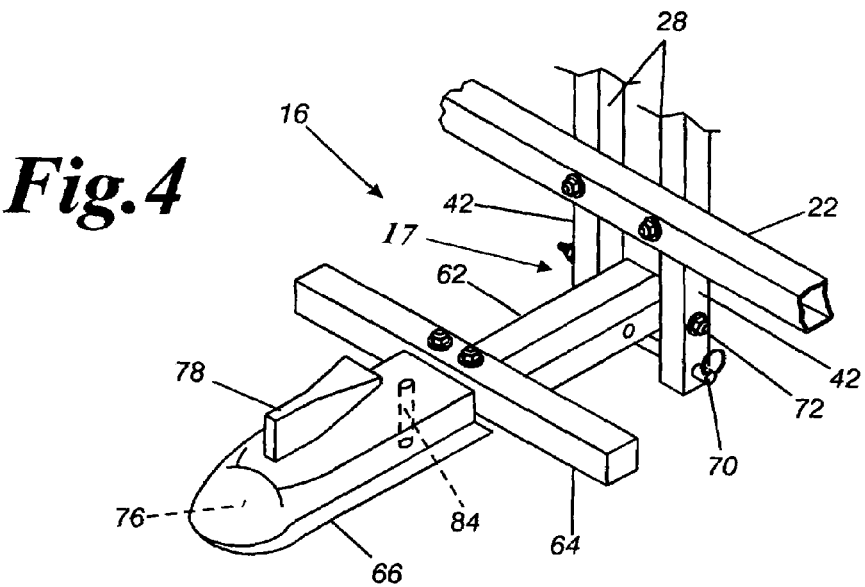
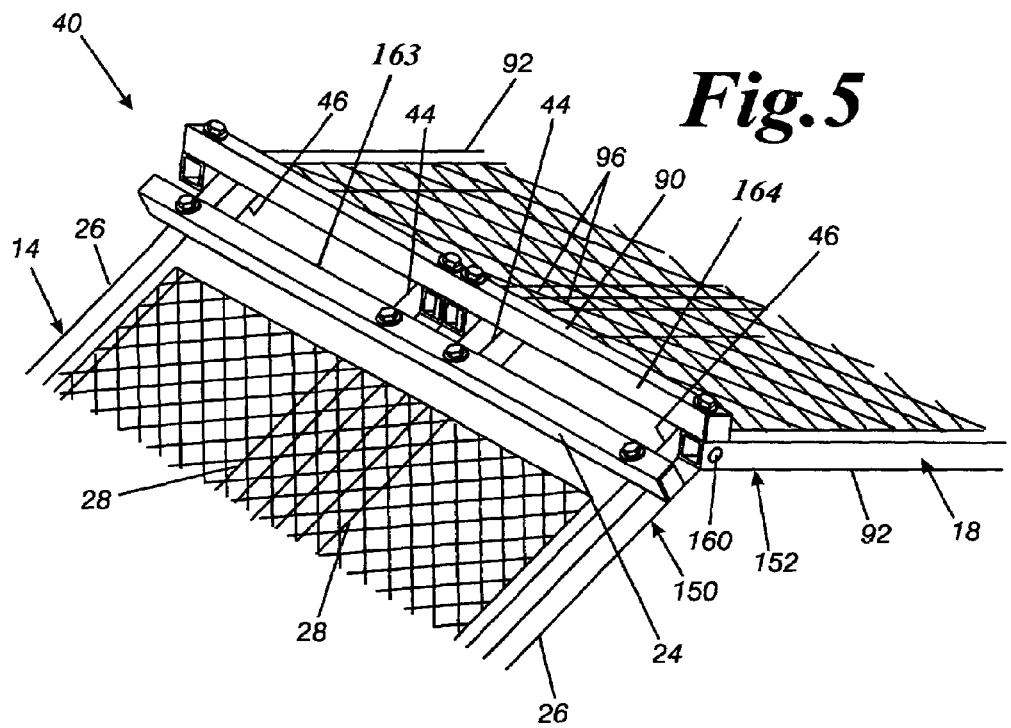

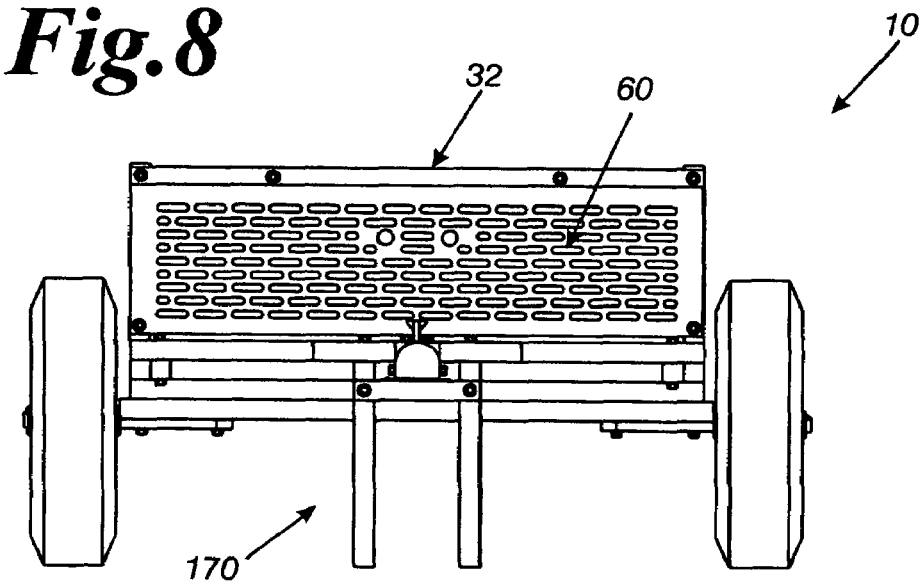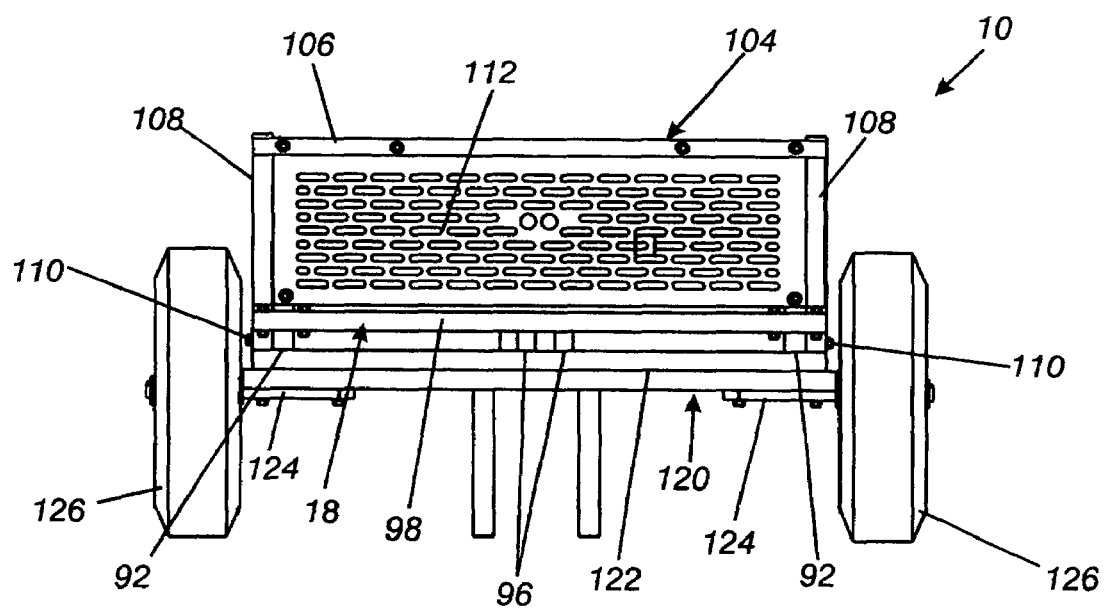

FOLDING TRAILER

CROSS REFERENCE TO RELATED APPLICATIONS

This application is a continuation-in-part of U.S. patent application Ser. No. 10/140,652, filed May 7, 2002; now abandoned, which claims the benefit of U.S. Provisional Application No. 60/289,104, filed May 7, 2001; both of which are incorporated by reference.

BACKGROUND OF THE INVENTION

1. Field of the Invention

The present invention relates generally to the field of trailers for hauling items and, more specifically, to foldable trailers that may be hitched to an all-terrain vehicle (ATV).

2. Description of the Related Art

Trailers are used to haul a wide variety of items such as recreational vehicles, landscaping items, tools and hunting gear. Trailers come in a myriad of sizes, load capacities and configurations. Some are structured for road use, towed by an automobile. Others are suitable for off-road use, pulled by tractor, all-terrain vehicle (ATV), or other vehicle.

An ATV is a small motorized vehicle that is designed primarily for off-road use by a single person. ATVs are provided with three or four large, balloon-like tires capable of traversing difficult terrain. They are particularly popular with hunters, ranchers, farmers, naturalist and others who, for work or pleasure, desire to go into terrain where other vehicles are ill-suited to take them. ATVs are generally provided with the trailer hitch to which a trailer may be coupled.

Due to the harsh terrain through which the ATV may travel, additional considerations are necessary in the configuration of a suitable companion trailer. For example, it is desirable that the trailer has a simple configuration and that it is manageable by one person. It is also desirable that the trailer be capable of carrying a heavy load over rough terrain as the trailer may be used to support a full load of camping gear, deer, fencing or other items. Moreover, since there are limited resources at a camping or hunting site it is desirable that the trailer be useable for other purposes, such as for being used as a hand-truck for moving firewood. Furthermore, it is desirable that the trailer be collapsible and easily carried by an ATV in order to facilitate bringing the trailer to otherwise unattainable locations. And, it is desirable that the trailer may still be used to haul items even after it has been folded to the ATV.

Various foldable trailers have been proposed in the past. Typically, these trailers comprise component parts which must be fitted together in order to use the trailer, and then disassembled after use in order to carry and/or store the trailer. An example of such a trailer is described in U.S. Pat. No. 4,764,142 to Davis whereby a trailer is illustrated that may be disassembled and then folded in suitcase-like fashion for being transported and stored. Similarly, Dodson, U.S. Pat. No. 5,340,134, provides a trailer that is collapsible in order to aid in storage and in the portability of the trailer.

Conventional foldable trailers have several limitations. For one, they are only useable when fully deployed. Also, they require time-consuming disassembly into several parts in order carry or store the trailer. As such, in the context of being used with an ATV, a conventional trailer would need to be deployed in order to carry items, thus limiting the terrain through which the driver could traverse. And, in order to travel difficult terrain, the driver would need to time-consumingly dismantle and somehow carry the trailer and any stowed items until more suitable terrain is reached.

One trailer that remedies some of the above noted limitations is shown in U.S. Pat. No. 5,354,090 to Grovom. The Grovom trailer can remain hitched to an ATV while the trailer is supported by the ATV, above the ground, in a position vertically pivoted from the hitch. Prior to pivoting, the trailer frame is telescopically shortened to ease carrying the trailer. This shortened and suspended position allows for the trailer to egress through harsh terrain. However, the configuration of the telescopic framework requires that the trailer floor be comprised of a flexible mesh in order to allow for the trailer to be telescopically shortened. Accordingly, the load carrying capacity of the trailer is limited by the flexible mesh floor, the mesh allows for items to unintentionally fall there-through, and the mesh is prone to damage from rocks and brush that may engage there-against. Additionally, although the trailer may be telescopically shortened in order to ease lifting of the trailer onto the ATV, the full weight of the trailer must still be bore by the driver during the lifting process.

Accordingly, what is needed is a durable trailer that is capable of supporting a heavy load and is attachable to an ATV. Also needed is for the trailer to the foldable without disassembly and to be capable of being carried by an ATV through rough terrain. Further needed is for the trailer to be useable to carry items even when folded against an ATV. Still further needed is for the trailer to have a simple construction and be easily manageable by one person.

SUMMARY OF THE INVENTION

To achieve the foregoing and other objects, the present invention, as embodied and broadly described herein, provides various embodiments of a foldable trailer that is towable by an ATV. Embodiments of the invented trailer have a simplistic configuration, yet are capable of supporting a heavy load over rough terrain. Furthermore, various embodiments of the trailer are foldable against, and carryable by, an ATV. When in the folded position, the trailer remains capable of carrying a load in order to facilitate the transport of supplies and gear through difficult terrain.

In a preferred embodiment of the present invention, a foldable trailer includes a first bed, second bed and hitch, each having a top and bottom surface. The hitch is rotatably attached to the first bed about a first axis of rotation. The first bed is rotatably attached to the second bed about a second axis of rotation. The first bed is adapted to rotate about the first axis such that an angle between the first bed top surface and the hitch top surface is smaller when the trailer is folded than when the trailer is in a deployed position. Also, the second bed is adapted to rotate about the second axis such that an angle between the first bed bottom surface and the second bed bottom surface is smaller when the trailer is folded than when the trailer is in the deployed position. Moreover, the trailer maybe supported above the ground by the vehicle while remaining coupled to the vehicle.

Optionally, the invented trailer may also include a first rail that is pivotably connected to the second bed and a third axis of rotation. The first rail may be rotated about the third axis from a first position that is at the second bed top surface to a second position that is generally perpendicular to the second bed top surface while the trailer is folded and coupled to the vehicle.

As another option, the trailer may include a support that is load bearing against the ground such that it offsets at least a portion of the trailer's weight while the trailer is being folded against a vehicle.

In a preferred embodiment, the invented folding trailer includes a hitch, a first bed pivotably attached to the hitch, and a second bed pivotably attached to the first bed. The first bed has a top surface, a bottom surface, a fore member, a pair of spaced apart side members attached to the fore member, an intermediate member disposed between the side members and attached to the fore member, and a rear member attached to the side members and also to the intermediate member. The second bed has a top surface, a bottom surface, a fore beam, a pair of spaced apart side beams, an intermediate beam disposed between said side beams and attached to the fore beam, and a rear beam attached to the side beams and also to the intermediate beam. The rear member abuts the fore member when the trailer is in a deployed position in order to provide resistance to a load that may be applied to the trailer.

Optionally, the rear member may have a rearward facing surface and the fore beam may have a forward facing surface. These surfaces are configured to engage each other when the trailer is in the deployed position in order to provide resistance to a load that is applied to the trailer. As another option, the surfaces may be complementary angled.

In a preferred embodiment, the invented folding trailer includes a hitch, first bed and second bed, each having top and bottom surfaces. A first hinge is provided that defines a first axis of rotation between the hitch and the first bed. A second hinge is provided that defines a second axis of rotation between the first bed and the second bed. The first bed is adapted to be rotated about the first axis such that the first bed top surface is rotated towards the hitch top surface, resulting in a first bed top surface to hitch top surface relationship when the trailer is folded. The second bed is adapted to be rotated about the second axis such that the second bed bottom surface is rotated towards the first bed bottom surface, resulting in a second bed bottom surface to first bed bottom surface relationship when the trailer is folded. Moreover, the trailer may be supported above the ground by the vehicle while the hitch is coupled to the vehicle.

BRIEF DESCRIPTION OF THE DRAWINGS

The above described and other features, aspects, and advantages of the present invention are better understood when the following detailed description of the invention is read with reference to the accompanying drawings, wherein:

FIG. 4 is a perspective view of the trailer hitch portion of the trailer;

FIG. 5 is a perspective view of the central hinge of the trailer;

FIG. 8 is a front view of the trailer;

FIG. 9 is a rear view of the trailer;

DETAILED DESCRIPTION

The present invention will now be described more fully hereinafter with reference to the accompanying drawings in which preferred embodiments of the invention are shown. This invention may, however, be embodied in many different forms and should not be construed as limited to the embodiments set forth herein. These exemplary embodiments are provided so that this disclosure will be both thorough and complete, and will fully convey the scope of the invention to those skilled in the art.

In various embodiments of the present invention, a foldable trailer is described that is towable by an ATV, riding lawn mower and/or other vehicle. Embodiments of the invented trailer have a simplistic configuration, yet are capable of supporting a heavy load through rough terrain. Furthermore, in various embodiments, the trailer is tightly foldable against, and carryable by, an ATV. When in the folded, closed position, the trailer remains capable of carrying a load in order to facilitate the transport of various items.

Figure 1:
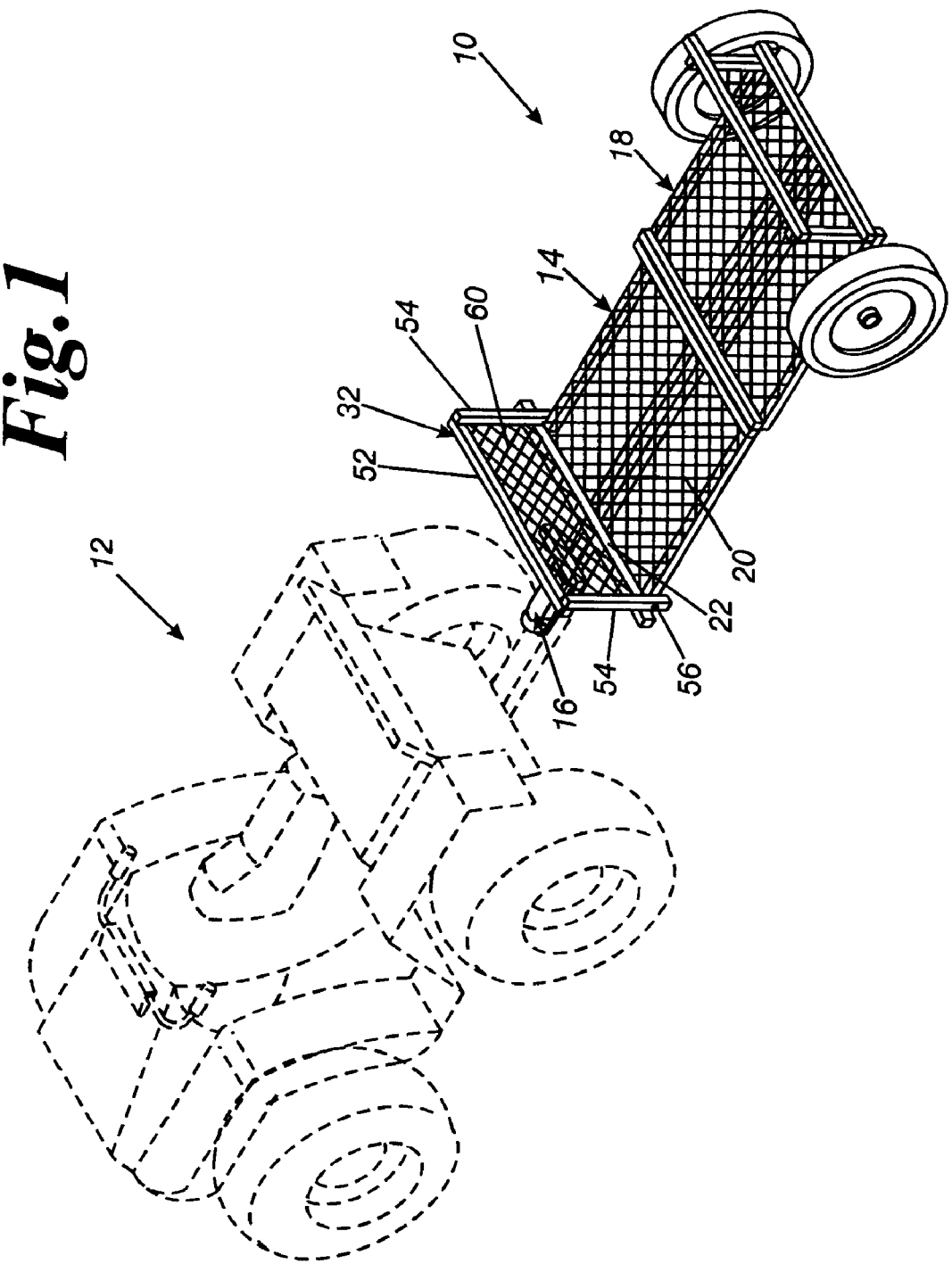
FIG. 1 is a perspective view of the invented trailer, in the deployed position, coupled to an ATV.

It is noted that orientational terms such as front, back, fore, aft, top, bottom, rearward, forward, upward, downward, proximal, distal, and other such terms, as used herein, are in reference to the invented trailer as being in a deployed position, as illustrated in FIG. 1. As such, the top is that portion of the trailer that is directed upwards, the bottom is that portion that is directed towards the ground, the front, fore or proximal is that portion that is located closer to the hitch, and the rear, aft or distal is that portion that is located further from the hitch.

Figure 13:
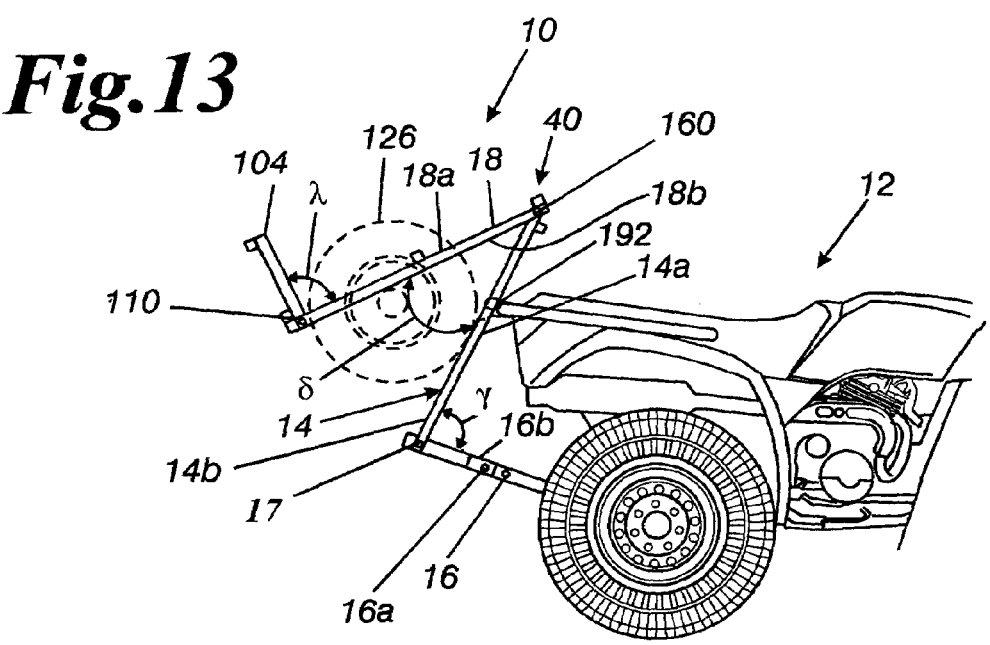
FIG. 13 is a side view of the trailer in a folded position and coupled to an ATV.

Referring to FIG. 13, an embodiment of the present invention is a trailer 10 is shown in a folded position, coupled to an ATV 12. The trailer 10 includes a front bed 14 with a top 14a and a bottom 14b; a hitch assembly 16, having a top 16a and a bottom 16b, that is pivotally connected to the front bed 14 by a first hinge 17 and extends forward for attachment to the ATV 12; and a rear bed 18, having a top 18a and a bottom 18b, that is pivotally attached by a second hinge 40 to the rear of the front bed 14. The first and second hinges 17, 40 define respective first and second axes of rotation about which portions of the trailer 10 may be rotated.

Referring to FIG. 1, the front bed 14 is comprised of a substantially rectangular frame and a floor 20 affixed to the frame. Preferably the frame is made of tubular, square-shaped steel members, although other materials and configurations can be used. Referring to the bottom view of FIG. 7, the frame perimeter is formed of laterally oriented fore and rear members 22, 24 which are joined by a pair of parallel longitudinal side members 26. A pair of parallel intermediate members 28, laterally spaced apart from the longitudinal center-line of the front bed 14, also join the fore and rear members 22, 24.

The frame members are interconnected in an overlapping manner which allows for the trailer 10 to fold while providing a durable and strong structure. Preferably, the fore and rear members 22, 24 are secured to the top surface of the side and center members 26, 28. The terminal ends 30 of the fore member 22 extend a sufficient distance beyond the side members 26, such as one to three inches, to serve as an abutment surface against which a rotatable front rail 32 (see also FIG. 1) is stopped when the rail 32 is placed in an upright position. The terminal ends 34 of the rear member 24 extend a sufficient distance beyond the side members 26, such as one to three inches, to serve as part of a second hinge 40, described in detail below.

The proximal ends 42 of the intermediate members 28 extend forwardly several inches past the fore member 22 to which the hitch assembly 16 attaches. The distal ends 44 of the intermediate members 28, along with distal ends 46 of the side members 26, extend equidistantly rearward a sufficient distance, such as one to three inches, past the rear member 24 to form a front part of the second hinge 40.

The front floor 20, positioned between the fore and rear members 22, 24, is affixed to the top surface of the side and intermediate members 26, 28 to provide a surface for supporting items being hauled. The floor 20 is can be of a meshed or solid configuration, and constructed from a variety of materials such as, for example, wire, nylon, polyester, plastic and sheet metal. Preferably, the floor 20 will be metal with small openings 50 formed therein. The rigid metal floor 20 can support heavy loads without substantial deflection, which could otherwise reduce ground clearance and result in damage. The openings 50 reduce overall trailer weight, and are sized to avoid carried items from falling there-though while allowing water or other fluids to drain from the trailer 10.

Figure 10:
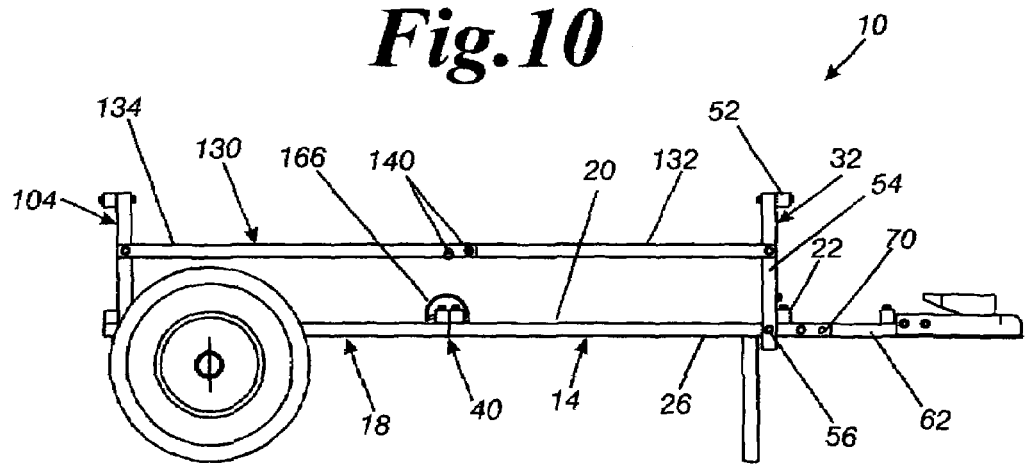
FIG. 10 is a left side view of the trailer.

Referring to FIGS. 1 and 10, the front rail 32 is pivotally attached to the side members 26 for selective rotation between a closed position against the front floor 20 and an upright position that may be used when hauling items. The front rail 32 includes a laterally oriented cross member 52 to which is affixed, at opposed ends, a pair of parallel side-rail members 54. The lower ends of the side-rail members 54 are rotatably attached to the outer surface of the respective side members 26 by a suitable pivot 56. The pivot 56 is positioned slightly rearward of the fore member 22 so that when the front rail 32 is rotated ninety degrees upright, the side-rail members 54 engage the fore member 22 to hold the front rail 32 in the upright position.

Figure 3:
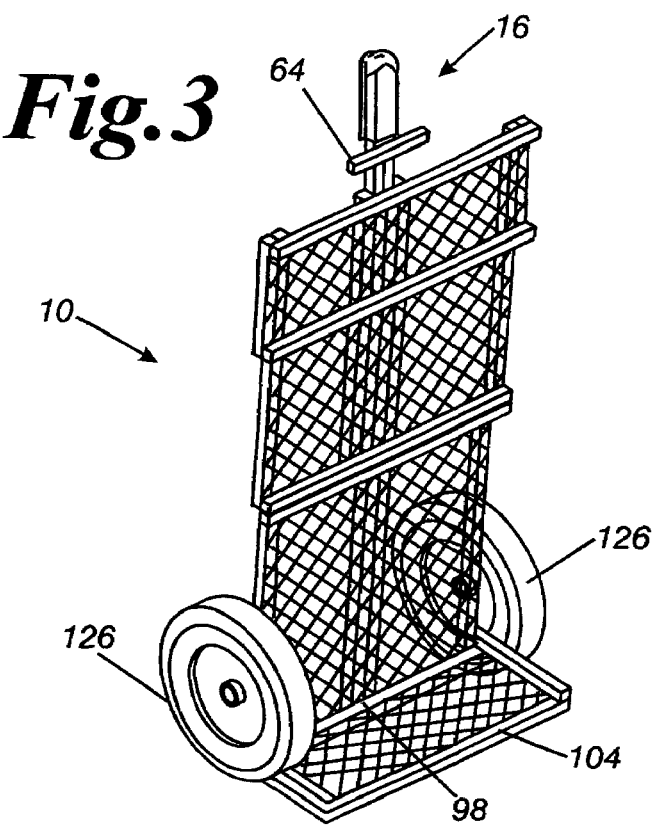
FIG. 3 is a perspective view of the trailer in a position for being used as a hand-truck.

Furthermore, the side-rail members 54 are attached to the rear surface of the cross member 52 in order to offset the cross member 52 so that when in the closed position, the side-rail members 54 and side members 26 are coplanar such that the front rail 32 rest flat against the trailer front floor 20 (see FIG. 3).

The pivot 56 may be any suitable pivot that allows for the front rail 32 to be manually rotated. For example, but not to be construed as limiting, an opening can be provided through the lower end of each side-rail member 54 which coaxially aligns with a respective opening in each side member 26. Each pair of coaxially aligned openings is configured to receive a pivot shaft there-through. The pivot shaft can be held in place by any known means such a retaining ring, or a complementary threaded nut. A nylon washer is disposed between the side-rail members 54 and the side members 26. Moreover, friction between the side-rail members 54 and respective washer maintain the front rail 32 in position, upright or closed, until overcome by manual force from an operator. The pivot shaft can additionally be provided with suitable bearings, such as a flange sleeve bearing.

As shown in FIG. 8, the front rail 32 is provided with a covering surface 60. Any of the alternatives described for the front floor 20 are applicable to the front rail surface 60. However, a netted configuration (see FIG. 1) of nylon is preferred for weight considerations.

Referring to FIG. 4, the hitch assembly 16 is pivotally attached to the proximal ends 42 of the intermediate members 28 by the hinge 17. The hitch assembly 16 includes a longitudinally oriented tow bar 62 to which is attached a handle 64 and a coupling mechanism 66. The tow bar 62 may be made of one, or a plurality of members as shown, with its distal end rotatable attached between the intermediate members proximal ends 42.

To pivotally attach the tow bar 62 to the intermediate members 28, first and second openings are provided through the intermediate members proximal ends 42 which coaxially align with first and second openings provided through the tow bar 62. First and second pins 70, 72, pivots or other suitable means, are received through the set of first and second openings, respectively. The pins 70, 72 are preferably held in position by a retaining ring, bolt or spring loaded detent. When the trailer is in the deployed position, both pins 70, 72 are positioned in their respective openings whereby the hitch assembly 16 is held in a fixed, locked position with respect to the front bed 14. To fold the trailer, only the second pin 72 is set in position, whereby the pin 72 acts as a pivot that provides a rotatable joint between the hitch assembly 16 and the front bed 14. If desired, the hitch assembly 16 may be removed from the front bed 14 by removing the pins 70, 72.

Figure 11:
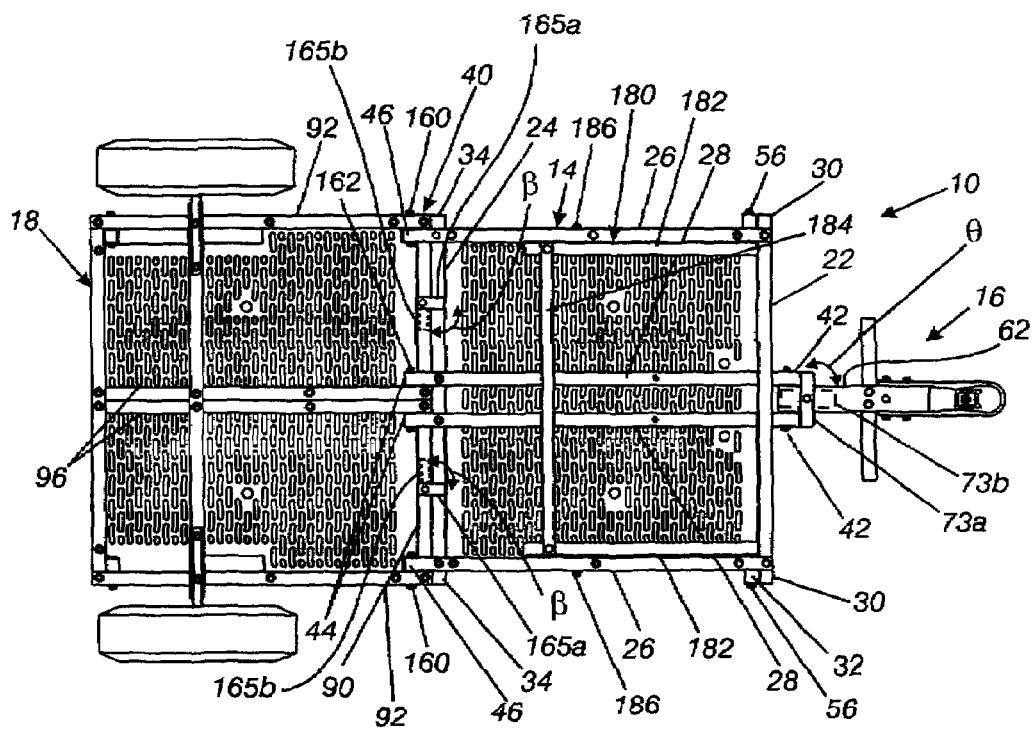
FIG. 11 is a bottom view of the trailer wherein the trailer has alternative means for securing the hitch and the first and second beds of the trailer in a deployed position, and wherein the trailer also has a support for assisting a person in placing the trailer into a folded position on an ATV.

An alternative means for locking the hitch assembly 16 is illustrated by FIG. 11. A rod 73a is rotatably attached to the hitch assembly 16 by a suitable pivot in order to allow for the rod 73a to be manually rotated 90° (θ) from a locked position 73a for when the trailer 10 is in the deployed position, to an open position 73b (shown in stipple) that is used when folding the trailer 10. When the rod 73a is in the locked position, the rod 73a abuts the intermediate members 28 thereby restricting downward rotation of the hitch assembly 16. When the rod 73b is in the open position, it may pass freely between the intermediate members 28 in order to allow for the hitch assembly 16 to be rotated.

Referring to FIG. 4, the handle 64 is laterally oriented across the tow bar 62 and extends a sufficient distance beyond the tow bar 62 in order to allow a person to grasp to handle 64. The handle 64 facilitates the use of the trailer 10 as a hand-truck.

The coupling mechanism 66 is removably secured to the proximal end of the tow bar 62 by a plurality of bolts or other suitable means. The coupling mechanism 66 has a standard configuration that includes a socket 76 for receiving a ball from a vehicle's, riding lawn mower's or ATV's hitch and a latch 78 for securely coupling the ball and socket 76. A vertical opening 84 may also be provided through the proximal end of the tow bar 62 for receiving a pin for attachment to riding lawn mowers that utilize a pin and hole type hitch instead of a ball and socket assembly.

Figure 7:
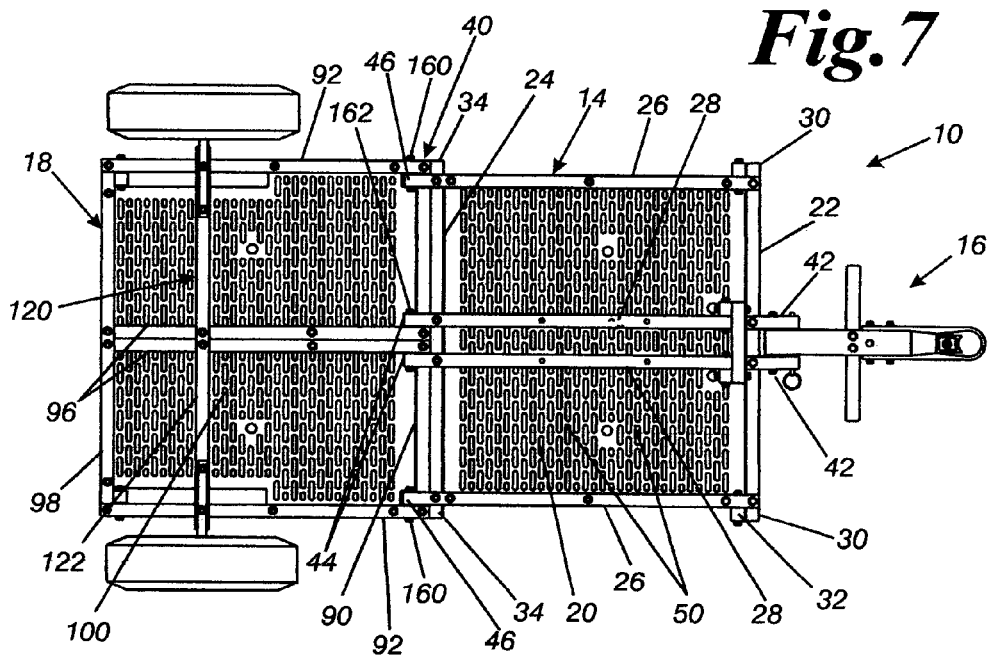
FIG. 7 is a bottom view of the trailer.

As illustrated in FIG. 7, the rear bed 18 has a generally rectangular frame and includes a laterally oriented fore member 90 to which is affixed a pair of parallel, rearward extending side members 92 and a pair of parallel, rearward extending intermediate members 96. The side members 92 are affixed at opposed ends of the fore member 90 and the intermediate members 96 are preferably adjacent to a midpoint of the fore member 90. Each of the side and intermediate members 92, 96 are attached to the bottom surface of the fore member 90. A rear member 98 laterally extends across, and is attached to the top surfaces, of the side and intermediate members 92, 96. Preferably, the frame members are tubular, square-shaped steel, although other materials and configurations can be used.

Figure 6:
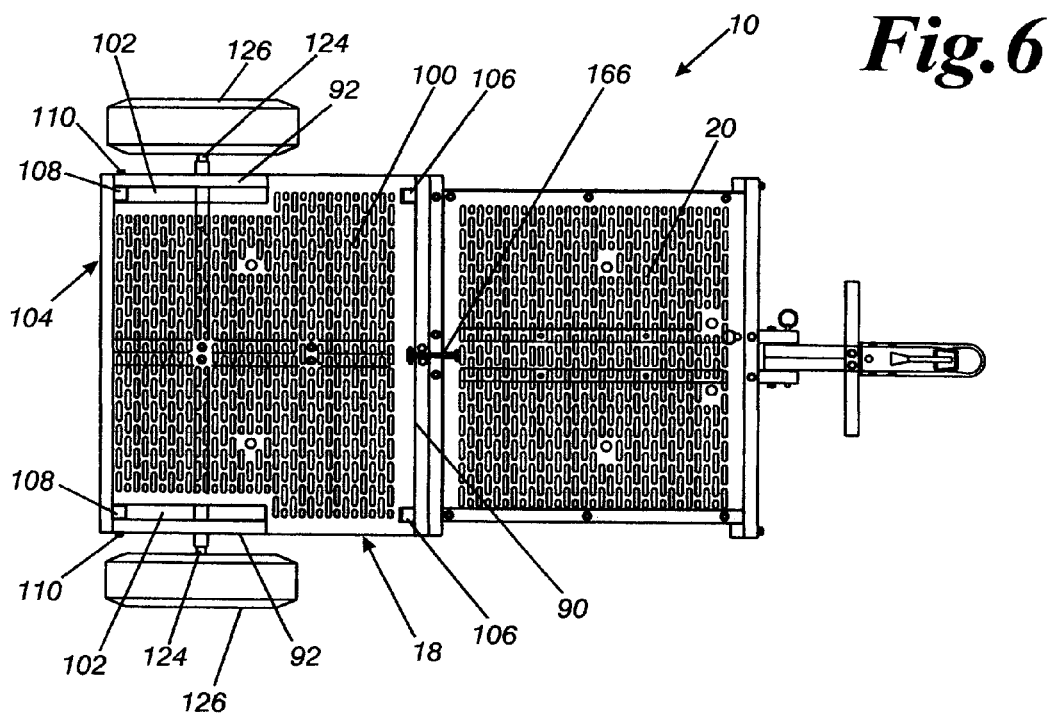
FIG. 6 is a top view of the trailer.

The rear bed 18 is provided with a floor 100. The rear floor 100 is positioned between the fore and rear members 90, 98, and is affixed to the top surface of the side and intermediate members 92, 96, to provide a surface for supporting items being hauled. As illustrated in FIG. 6, two sections 102 of the rear bed floor 100 are cut-away to allow for a rear rail 104 to close. Another pair of cutouts 106 is provided in the rear floor 100 to correspond with the distal ends 46 of the front side members 26 so that the side members 26 do not interfere with the rear floor 100 when folding the trailer 10. The rear floor 100 is made of the same materials as described for the front floor 20.

Referring to FIG. 6 in conjunction with FIG. 9, the rear rail 104 is pivotally attached to the side members 92 for selective rotation between a closed position against the rear floor 100 and an upright position that is generally perpendicular to the rear floor 100 for when hauling items. The rear rail 104 includes a laterally oriented cross member 106 to which is affixed, at opposed ends, a pair of parallel side-rail members 108. The proximal ends of the side-rail members 108 are rotatably attached to the inner surface of the respective side members by a hinge, which defines an axis of rotation, such as the illustrated pivot 110. The pivot 110 may be configured as previously described with regards to the pivot 56 of the front rail 32. The rear rail 104 may also be provided with a covering surface 112, such as those surfaces previously described in conjunction with the front rail 32.

The side-rail members 108 are attached to the front surface of the cross member 106, offsetting the cross member 106 so that when the rear rail 104 is in the closed, folded position, the side-rail and side members 108, 92 are in a common plane and the rail surface 112 rests against the trailer floor 100. When closing the rear rail 104, the side-rail members 108 pass into the cutaway sections 102 to facilitate the generally flat positioning of the rear rail 104.

When the rear rail 104 is in the ninety-degree upright position, the side-rails 108 abut the rear member 98, restricting the rear rail 104 from extending past the upright position.

Referring to FIGS. 7 and 9, an axle assembly is secured to the underside, distal end, of the rear bed 18. Any suitable axle assembly may be used, such as the illustrated assembly 120 which includes at least one transverse member 122 affixed to the rear center and side members 96, 92 and extends outwardly beyond the rear side members 92. A plurality of transverse members can be used to provide additional strength as necessary. Axles 124 extends from the transverse member 122 to which wheels 126 are attached.

Optionally, side rails 130 can be provided, as shown in FIG. 10. A variety of side rails are suitable for use with the trailer 10. The illustrated embodiment shows each side rail 130 comprising a first member 132 that is removably attachable to the front rail 32 and a second member 134 removably attachable to the rear rail 104. The two members 132, 134 are joined together by any suitable means 140, such as, for example, a pair of bolts secured by screws, rods held by pins, or rods with spring loaded detents.

As another example, the side rails could each be a single member removably attachable to the front and rear rails. As a further example, the side rails could include a cross member that has, affixed at its opposed ends, downward extending side-rails which terminate as prongs. Openings provided through the front and rear side members may receive the prongs for removably holding the side-rails in place. As yet another example, stubs may be provided on each of the side members of the front and back rails. Hollow side-members may then be inserted over the stubs in order to form the side-rails. These alternative configurations are not illustrated in the drawings.

Each of the alternative side rails may be provided covering side wall. Preferably, for weight considerations, the side wall is a nylon netting which ties to the side-rails and the corresponding side members.

The hinge 40, detailed in FIG. 5, rotatably joins the first and second beds 14, 18. Although several known configurations of hinges may be used to allow the trailer 10 to fold, the preferred hinge 40 provides simplistic folding and significant load bearing capability. The front portion 150 of the hinge 40 includes the rear member 24 and the distal ends 46, 44 of the side and intermediate members 26, 28 of the front bed 14. The rear hinge portion 152 comprises the fore member 90 and the proximal ends of the side and intermediate members 92, 96 of the rear bed 18.

Referring to FIG. 7, the front and rear hinge portions 150, 152 are rotatably attached together by having the front bed side members 26 disposed adjacent to the respective rear bed side members 92 and joined by a pivot 160. Likewise, the front bed center members 28 are disposed adjacent to the front bed intermediate members 96 and joined by a pivot 162. Each pivot 160, 162 may be any suitable pivot, but preferably includes coaxial openings formed through the adjacent members for receiving a pivot shaft. The pivot shafts can be held in place by any known means, such as retaining rings or a complementary threaded nut.

When the trailer 10 is fully deployed for carrying a load, opposing faces of the front bed rear member 24 and the rear bed fore member 90 engage in compression. Additionally, the bottom surface of the rear bed fore member 90 engages in compression with the upper surface of the front bed side 26 and center members 28. This configuration provides the hinge 40 with excellent load bearing capability. For example, when the members are 1" square, grade thirty-six, tubular steel, the hinge 40 supports a load of at least 800 lbs. When made of grade forty-six tubular steel, the hinge 40 supports a load of at least 1000 lbs.

Referring to FIG. 5, the rearward facing surface 163 of the front bed rear member 24 and forward facing surface 164 of the rear bed fore member 90 may be angled. That is, the rearward facing surface 163 may be angled in an upward rearward direction while the forward facing surface 164 may be angled in a downward, forward direction. Alternatively, the rearward facing surface 163 may be angled in a downward, rearward direction while the forward facing surface 164 may be angled in an upward, forward direction. In either case, the angled surfaces are complementary such that the surfaces 163, 164 abut each other and engage in compression when the trailer is in the deployed position in order to resist loads applied to the trailer.

Referring to FIG. 10, various means may be used to keep the hinge 40 locked in the deployed position. For example, a removable pin 166 may be inserted through coaxial openings in the front bed rear member 24 and the rear bed fore member 90. As another example, illustrated by FIG. 11, at least one rod 165a may be rotatably attached to the rear bed fore member 90 by a suitable pivot in order to allow for the respective rod 165a to be manually rotated 90° (β) from a locked position 165a for when the trailer 10 is in the deployed position, to an open position 165b (shown in stipple) used when folding the trailer 10. When the rods 165a are in the locked position, the rods 165a abut the front hinge rear member 24 thereby restricting upward rotation of the hinge 40. When the rod 73b is in the open position, the first and second beds 14, 18 may be rotated about the hinge 40 in order to fold the trailer 10.

Figure 2:
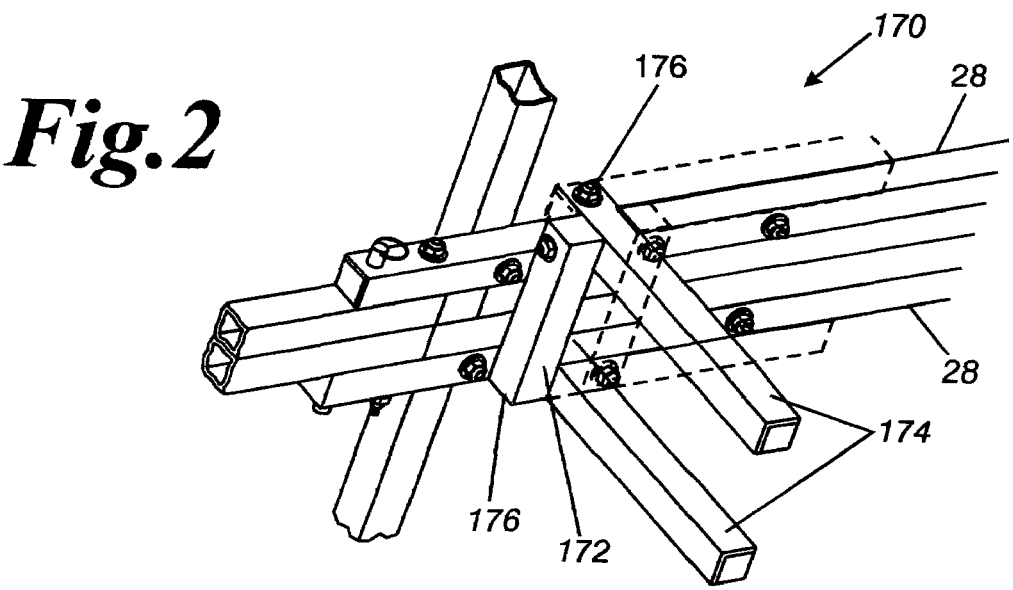
FIG. 2 is a perspective view illustrating the stand portion of the trailer.

As shown in FIG. 10, the trailer 10 may optionally be provided with a stand 170 to hold the front end of the trailer 10 in a horizontal position above the ground when detached from the ATV 12. As detailed in FIG. 2, the stand 170 includes a cross member 172 and a pair of legs 174 extending from opposed ends of the cross member 172. The stand 170 is rotatably attached to the front bed center members 28 by a suitable pivot 176 to allow for selective positioning between a closed position (shown in stipple) and an open position to support the trailer 10. To open, the legs 174 are rotated ninety degrees downwards until the cross member 172 abuts the front bed 14 center members 28. A pin or other suitable member can be used to lock the stand 170 in the closed or open position.

Figure 12:
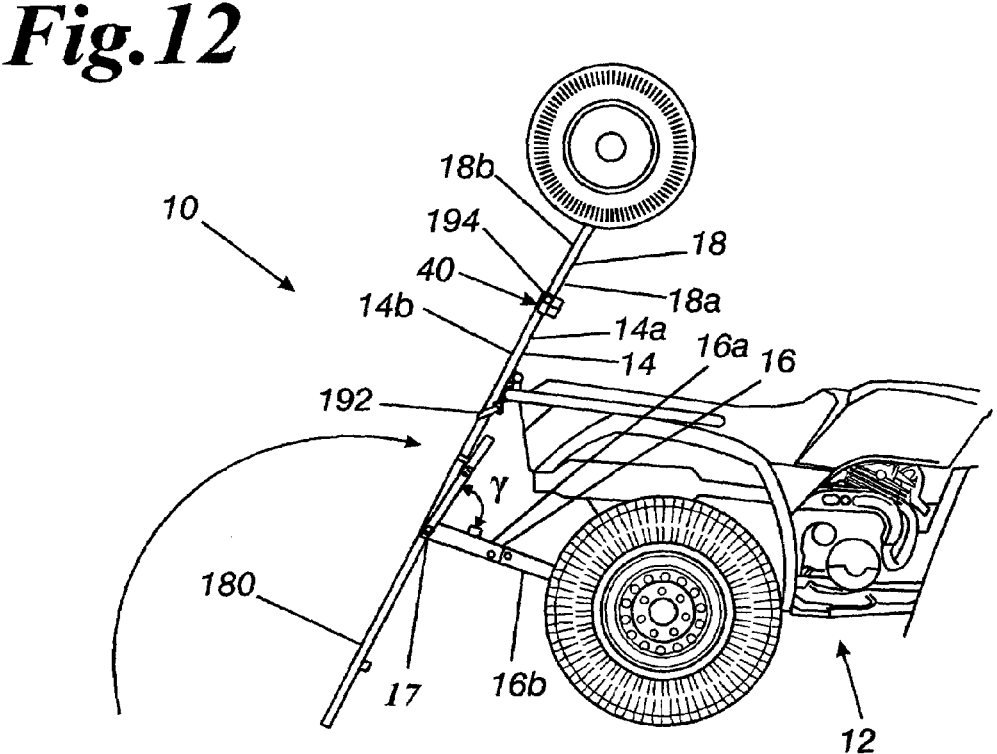
FIG. 12 is a side view of the trailer of FIG. 12 wherein the stand is being used to support the weight of the trailer in order to assist the person in placing the trailer into a folded position on the ATV.

Referring to FIGS. 11 and 12, the trailer 10 may optionally be provided with a support 180 in order to assist the driver in placing the trailer 10 in a closed, folded position against the ATV. As illustrated by FIG. 11, the support 180 includes a pair of legs 182 that are rotatably attached the front bed side members 26, by suitable pivots such as pivot 56, and a cross member 184 joining the legs 182. The pivots 56 allow for selective positioning of the stand 180 between a closed position (FIG. 11) and an open position (FIG. 12). Referring to FIG. 11, to maintain the stand in the closed position, removable pins 186 may be inserted into co-axial openings formed through the front bed side members 26 and the respective leg 182. When folding the trailer 10, the distal ends of the legs 182 are rotated to the ground and are placed in compression in order to offset the weight of the trailer 10 as it is being lifted and folded against the ATV 12, as illustrated by FIG. 12. Preferably, the legs 182 extend downward at least as far, and more preferably further, than any other portion of the trailer 10 including the tires.

Referring to FIG. 1, in operation, the deployed trailer 10 may be hitched to a vehicle, such as an automobile, ATV or lawn mower. When attached to an automobile, the trailer 10 would be adapted to comply with state and federal regulations pertaining to high speed tires, break lights, and the like, and could be sized to carry an ATV. When used off-road, the unique hinge 40 (FIG. 7) allows for the deployed trailer 10 to carry a significant load over rough terrain.

Referring to FIG. 13, the trailer 10, when in the closed, folded position, may remain coupled to the ATV 12 by the hitch assembly 16. In this position, the trailer 10 is suspended above the ground, tightly folded near or against the ATV 12. (FIG. 13 illustrates the trailer 10 in an intermediate folded position as the second bed 18 may be rotated closer to the first bed 14 in that the wheels 128 do not interfere with closing and opening of the trailer 10).

Referring to FIG. 10, to fold the trailer 10 against the ATV, the side rails 130 are disconnected and the front and rear rails 32, 104 are rotated to a closed position against the trailer floor. Referring to FIG. 11, then the rod 73b securing the tow bar is moved to the open position. The support 180 is then rotated to the ground, as shown in FIG. 12. Thereafter, the driver lifts the trailer 10 (see arrow), rotating the top 14a of the front bed 14 towards the top 16a of the hitch 16, about the first axis, resulting in a top 14a of the front bed 14 to top 16a of the hitch 16 relationship. That is, the top 14a of the front bed 14 is rotated in a direction that causes the top of the front bed 14 and the top 16a of the hitch 16a to face each other more than they do when the trailer 10 is in the deployed position. Stated another way, the angle γ between the top 14a of the front bed 14 and the top 16a of the hitch 16 is smaller when the trailer 10 is folded than when the trailer 10 is in the deployed position. During the lifting process, the stand 180 offsets a portion of the weight of the trailer 10, thereby significantly easing the task of folding the trailer 10 against the ATV 12.

Next, strapping 192 or the like may be used to tether the trailer 10 in this partially folded position. The rods 165a securing the front and rear beds 14, 18 is then moved to their open positions 165b in order to allow the bed 14, 18 to be rotated with respect to each other.

The driver then lowers the rear bed 18, rotating the bottom 18b of the rear bed 18 towards the bottom 14b of the front bed 14, about the second axis, as defined by the hinge 40, towards each other, resulting in a bottom 18b of the rear bed 18 to bottom 14b of the front bed 14 relationship. That is, the bottom 18b of the rear bed 18 is rotated in a direction that causes the rear bed bottom 18b and the front bed bottom 14b to face each other more than they do when the trailer 10 is in the deployed position. Stated another way, the angle δ between the bottom 18b of the rear bed 18 and the bottom 14b of the front bed 14 is smaller when the trailer 10 is folded than when the trailer 10 is in the deployed position. Again, during this portion of the folding process, the stand 180 (FIG. 12) offsets a portion of the trailer's 10 weight thereby significantly easing the task of folding the trailer 10 against the ATV 12.

In an alternative method for folding the trailer 10 against the ATV 12, the operator may push the rear bed 18 towards the front bed 14; rolling the beds 18, 14 towards each other before using the support 180 to aid in lifting the trailer 10.

If it is desired to carry a load while the trailer 10 is being carried by the ATV 12, the rear rail 104 may be rotated about a third axis, defined by the pivot 110, to the open position. That is, the rear rail 104 may be rotated in a direction away from the top 18a of the rear bed 18. Stated another way, the angle λ between the top 18a of the rear bed 18 and the rear rail 104 is larger when the rear rail 104 is in the open position than when the rear rail 104 in the closed position. Ideally, when in the open position, the angle λ between the rear rail 104 and the top of the rear bed 18b is about 90 degrees. This feature allows for gear to supplies to be carried to a destination site while the trailer 10 remains folded for easier egress through difficult terrain.

In an alternative method for folding the trailer 10 against the ATV 12, the operator may push the rear bed 18 towards the front bed 14; rolling the beds 18, 14 towards each other before using the support 180 to aid in lifting the trailer 10.

The trailer 10 can also be coupled to a riding lawn mower that uses a pin and hole type hitch. First, the coupling mechanism 66 (FIG. 4) is removed to expose the vertical opening 84 formed through the tow bar 62. Thereafter, the opening 84 is aligned with holes in a lawn mower hitch and a pin is inserted therein.

The trailer 10 can also be used as a hand cart, as shown in FIG. 3. The trailer 10 is placed in a deployed, upright position with the hitch assembly 16 at the top and the rear rail 104 at the bottom. The operator may loads articles onto the rear rail 104, then grasp the handle 64 to tilt and maneuver the trailer 10.

Furthermore, the trailer 10 is easily stored when in either the closed or deployed position. When in the deployed position, the trailer 10 is self-standing by having three points of contact with the ground in triangular relationship: the tires 126 and the rear member 98 of the rear bed 18.

Preferably the members are tubular, elongate and constructed of metal. However, other materials can be used such as plastic or PVC. Additionally, the members are not limited to being tubular, and may be solid or U-shaped, for example. Moreover, the members may be secured together by any known manner such as, for example, welding, rivets, bolts and adhesive. Bolting the various components together is found to be advantageous in the trailer can be fully dissembled for shipping and that damaged parts are easily replaced.

Furthermore, the number of members may be changed. For example, where a single member is illustrated in the drawings, a plurality of members can be used. Conversely, where a plurality of adjacent members is shown, a single member may be used.

The foregoing provides a detailed description of exemplary embodiments of the present invention. Although a folding trailer has been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. A trailer that is capable of being towed by a vehicle, said trailer comprising:
   a first bed having a top surface, a bottom surface, a fore member, a pair of spaced apart side members attached to said fore member, an intermediate member disposed between said side members and attached to said fore member, and a rear member attached to said side members and to said intermediate member;
   a hitch, having a top surface and a bottom surface, rotatably attached to said first bed, wherein said hitch is adapted for being coupled to the vehicle and wherein a first axis of rotation is defined between said hitch and said first bed;
   a second bed, having a top surface, a bottom surface, a fore beam a pair of spaced apart side beams, an intermediate beam disposed between said side beams and attached to said fore beam, and a rear beam attached to said side beams and to said intermediate beam, wherein said second bed is rotatably attached to said first bed and wherein a second axis of rotation is defined between said first bed and said second bed;
   wherein said first bed is adapted to rotate about the first axis such that an angle between the first bed top surface and the hitch top surface is smaller when said trailer is folded than when said trailer is in a deployed position;
   wherein said second bed is adapted to rotate about the second axis such that an angle between the first bed bottom surface and the second bed bottom surface is smaller when said trailer is folded than when said trailer is in the deployed position; and
   wherein said trailer may be supported above the ground by the vehicle while being coupled to the vehicle.

2. The trailer according to claim 1 further including a first rail pivotably connected to said second bed at a third axis of rotation, wherein said first rail may be rotated about the third axis from a first position that is at said second bed top surface to a second position that is generally perpendicular to said second bed top surface while said trailer is folded and coupled to the vehicle.

3. The trailer according to claim 2 further including a rigid first floor attached to said first bed and a rigid second floor attached to said second bed.

4. The trailer according to claim 1 further including a support attached to said trailer where an end of said support is placed against the ground and said support is placed in compression and offsets at least a portion of the weight of said trailer while said trailer is being lifted into the folded position.

5. The trailer according to claim 1 wherein said fore beam abuts and reacts against said rear member when said trailer is in the deployed position in order to provide load bearing for said trailer.

6. The trailer according to claim 5 wherein said fore beam abuts said side members when said trailer is in the deployed position.

7. The trailer according to claim 6 wherein said fore beam abuts said intermediate member when said trailer is in the deployed position.

8. The trailer according to claim 7 wherein said side members are pivotally attached to said side beams.

9. The trailer according to claim 8 wherein said intermediate member is pivotally attached to said intermediate beam.

10. A trailer that is capable of being towed by a vehicle, said trailer comprising:
    a first bed having a top surface, a bottom surface, a fore member, a pair of spaced apart side members attached to said fore member, and a rear member attached to said side members;
    a hitch, having a top surface and a bottom surface, rotatably attached to said first bed, wherein said hitch is adapted for being coupled to the vehicle and wherein a first axis of rotation is defined between said hitch and said first bed;
    a second bed, having a top surface, and a bottom surface, a fore beam, a pair of spaced apart side beams, and a rear beam attached to said side beams, wherein said second bed is rotatably attached to said first bed and wherein a second axis of rotation is defined between said first bed and said second bed;
    wherein said first bed is adapted to rotate about the first axis such that an angle between the first bed top surface and the hitch top surface is smaller when said trailer is folded than when said trailer is in a deployed position;
    wherein said second bed is adapted to rotate about the second axis such that an angle between the first bed bottom surface and the second bed bottom surface is smaller when said trailer is folded than when said trailer is in the deployed position; and
    wherein said trailer may be supported above the ground by the vehicle while being coupled to the vehicle.

11. The trailer according to claim 10 further including a first rail pivotably connected to said second bed at a third axis of rotation, wherein said first rail may be rotated about the third axis from a first position that is at said second bed top surface to a second position that is generally perpendicular to said second bed top surface while said trailer is folded and coupled to the vehicle.

12. The trailer according to claim 11 further including a rigid first floor attached to said first bed and a rigid second floor attached to said second bed.

13. The trailer according to claim 10 further including a support attached to said trailer where an end of said support is placed against the ground and said support is placed in compression and offsets at least a portion of the weight of said trailer while said trailer is being lifted into the folded position.

14. The trailer according to claim 10 wherein said fore beam abuts and reacts against said rear member when said trailer is in the deployed position in order to provide load bearing for said trailer.

15. The trailer according to claim 14 wherein said fore beam abuts said side members when said trailer is in the deployed position.

16. The trailer according to claim 15 wherein said side members are pivotally attached to said side beams.

* * * * *